United States Patent [19]

Jershin

[11] Patent Number: 4,640,038
[45] Date of Patent: Feb. 3, 1987

[54] APPARATUS FOR SUPPORTING A FISHING ROD HOLDER

[76] Inventor: James T. Jershin, 3309 S. 122nd Street, Omaha, Nebr. 68144

[21] Appl. No.: 776,540

[22] Filed: Sep. 16, 1985

Related U.S. Application Data

[63] Continuation-in-part of Ser. No. 512,459, Jul. 11, 1983, Pat. No. 4,541,196.

[51] Int. Cl.$^4$ ............................................. A01K 97/12
[52] U.S. Cl. ........................................... 43/17; 43/16; 43/21.2
[58] Field of Search .......................... 43/17, 16, 21.2; 248/511, 512, 518, 519, 530, 533, 534, 535, 538, 231.4

[56] References Cited

U.S. PATENT DOCUMENTS

| | | | |
|---|---|---|---|
| 525,132 | 8/1894 | Burke | 248/512 |
| 1,564,703 | 12/1925 | Nichols | 248/231.4 |
| 1,819,034 | 8/1931 | Luelloff | 43/17 |
| 2,548,351 | 4/1951 | Coombs | 43/21.2 |
| 2,877,828 | 3/1959 | Barnette | 248/511 |
| 3,623,685 | 11/1971 | Thomson | 248/511 |
| 3,834,057 | 9/1974 | Jansa | 248/533 |
| 3,858,833 | 1/1975 | Fink | 248/530 |
| 3,906,653 | 9/1975 | Williams | 43/21.2 |
| 4,527,349 | 7/1985 | Emory | 248/534 |
| 4,550,520 | 11/1985 | Bogue | 248/512 |

FOREIGN PATENT DOCUMENTS

| | | | |
|---|---|---|---|
| 428287 | 4/1926 | Fed. Rep. of Germany | 248/530 |
| 603073 | 6/1948 | United Kingdom | 248/511 |

Primary Examiner—Nicholas P. Godici
Assistant Examiner—Kurt Rowan
Attorney, Agent, or Firm—Zarley, McKee, Thomte, Voorhees & Sease

[57] ABSTRACT

An electrical signalling device for a fishing rod holder having an open topped rod support channel spaced forwardly of a rod handle receiving rim portion, includes a switch housing adapted for support on the rod holder, an electrical circuit in the housing including an electrically actuated signal means, a power source and an electrical connection therebetween including a normally open switch, a switch lever adapted for engagement by the handle of a rod supported in the fishing rod holder and bias means urging the lever downwardly whereby the switch is closed in response to upward movement of the switch lever against the urging of the bias means when a fish strikes on the line of the fishing rod. The switch lever may include a depending flange having a pair of downwardly and outwardly flaring inclined contact surfaces so that even lateral forces will result in upward movement of the switch lever to actuate the signalling device. A pair of signalling devices may be electrically interconnected for remote actuation of one device in response to actuation of the other device connected to a rod holder.

The invention also prevents a novel fishing rod holder support system and a ground stake extension for universal mounting of the rod holder and signalling device.

12 Claims, 18 Drawing Figures

APPARATUS FOR SUPPORTING A FISHING ROD HOLDER

CROSS REFERENCE TO RELATED APPLICATION

This is a continuation-in-part of patent application Ser. No. 512,459 filed on July 11, 1983, now U.S. Pat. No. 4,541,196.

BACKGROUND OF THE INVENTION

The present invention is directed generally to an apparatus for supporting a fishing rod holder of the type having a base with a mounting hole therein.

The invention is also generally directed to a signalling device adapted for attachment to a fishing rod holder for the purpose of alerting a fisherman that a fish has struck the line. More specifically, the present invention is directed to such a signalling device which may be either integrally manufactured with a fishing rod holder or provided as a unit which is easily removably attached to conventional fishing rod holders.

Signalling devices for fishing poles, rod holders and the like have been previously known but these have all had certain disadvantages which have thus limited their popularity. Some signalling devices are attachable to the fishing rod itself and thus can interfere with normal handling and operation of the fishing rod after it is removed from a rod holder. Other signalling devices which are mountable on a rod holder are actuated by a trigger which requires direct connection to the fishing line to thereby again interfere somewhat with the normal operation and use of the fishing rod. Still further signalling devices include custom rod holders wherein the fishing rod handle is received in a pivotal sleeve, the movement of which actuates the signalling device. Other custom rod holders receive the fishing rod in a stationary sleeve with the switch of the signalling device extending interiorly of the mouth of the sleeve for contacting and supporting the fishing rod handle. These devices are generally complicated in structure, expensive to manufacture and somewhat difficult to set up and use.

Accordingly, it is an object of the present invention to provide an improved fishing rod holder signalling device.

A further object of the invention is to provide such a signalling device which is easily removably connected to conventional fishing rod holders.

Another object is to provide such a signalling device which is operative without interference with the normal handling and operation of a fishing rod.

Another object of the invention is to provide such a signalling device which is of compact construction for easy storage in a fisherman's tackle box.

Another object of the invention is to provide such a signalling device which is adapted for actuation in response to lateral pulls on the fishing line as well as downward pulls on the line.

A related object of the invention is to provide such a signalling device which is adapted for use both in trolling and in set fishing.

Another object of the invention is to provide such a signalling device which is adjustable for actuation in response to tugs of varying intensity on the fishing line.

Another object is to provide such a signalling device which is simple in construction, economical to manufacture and efficient in operation.

These and other objects of the invention are believed to be achieved by the fishing rod holder signalling device of the present invention as described hereinbelow.

SUMMARY OF THE INVENTION

The fishing rod holder signalling device of the present invention is adapted for use in connection with the conventional U-shaped fishing rod holders having an open topped rod support channel at the forward end and a rod handle receiving rim portion at the rearward end so that the rearward end of the handle of a rod resting in the device is urged upwardly against the top of the rim portion. The signalling device of the invention includes a switch housing adapted for connection to the handle receiving rim portion, which housing includes an electrical circuit comprising an electrically actuated signal means, an electrical power source and an electrical connection between the signal means and power source including a normally open switch. A switch lever extends from the housing interiorly of the rim portion for engagement by the rearward end of a rod handle supported in the rod holder. A biasing mechanism urges the switch lever downwardly relative to the housing and the switch lever is operatively connected to the normally open switch for closing that switch in response to upward movement of the switch lever by the rod handle against the urging of the bias means when a fish strikes on the line.

It is preferred that the switch lever includes a depending flange having a pair of downwardly and outwardly flaring inclined contact surfaces so that even lateral forces of the fishing rod handle against the inclined contact surfaces will result in upward movement of the switch lever for actuating the signalling device.

A preferred mounting arrangement for the signalling device is an at least partial mounting rim adapted for registration with the handle receiving rim portion of the fishing rod holder and fasteners for securing the mounting rim and rim portion in registered relation.

The invention is further directed to an improved apparatus for supporting a fishing rod holder, which apparatus includes an elongated channel strip having a plurality of spaced-apart holes in the top wall of the channel and flanges extended horizontally from the side walls of the channel for supporting a slidable securement bracket thereon. A fishing rod holder can be secured by a first fastener to the top wall at any selected one of the holes therein and the securement bracket can be fixed in position by a second fastener inserted through an alternate one of the top wall holes.

Finally, the invention contemplates an improved ground stake for supporting either a fishing rod holder directly or the above-described elongated channel strip of the invention. The improved ground stake includes a generally cylindrical medial portion adapted to be fit in telescopic relation into the open end of a tubular extension member which is tapered at the opposite end to thereby provide a ground stake of extended length.

DESCRIPTION OF THE PREFERRED EMBODIMENTS

Figures 1, 2, 3:
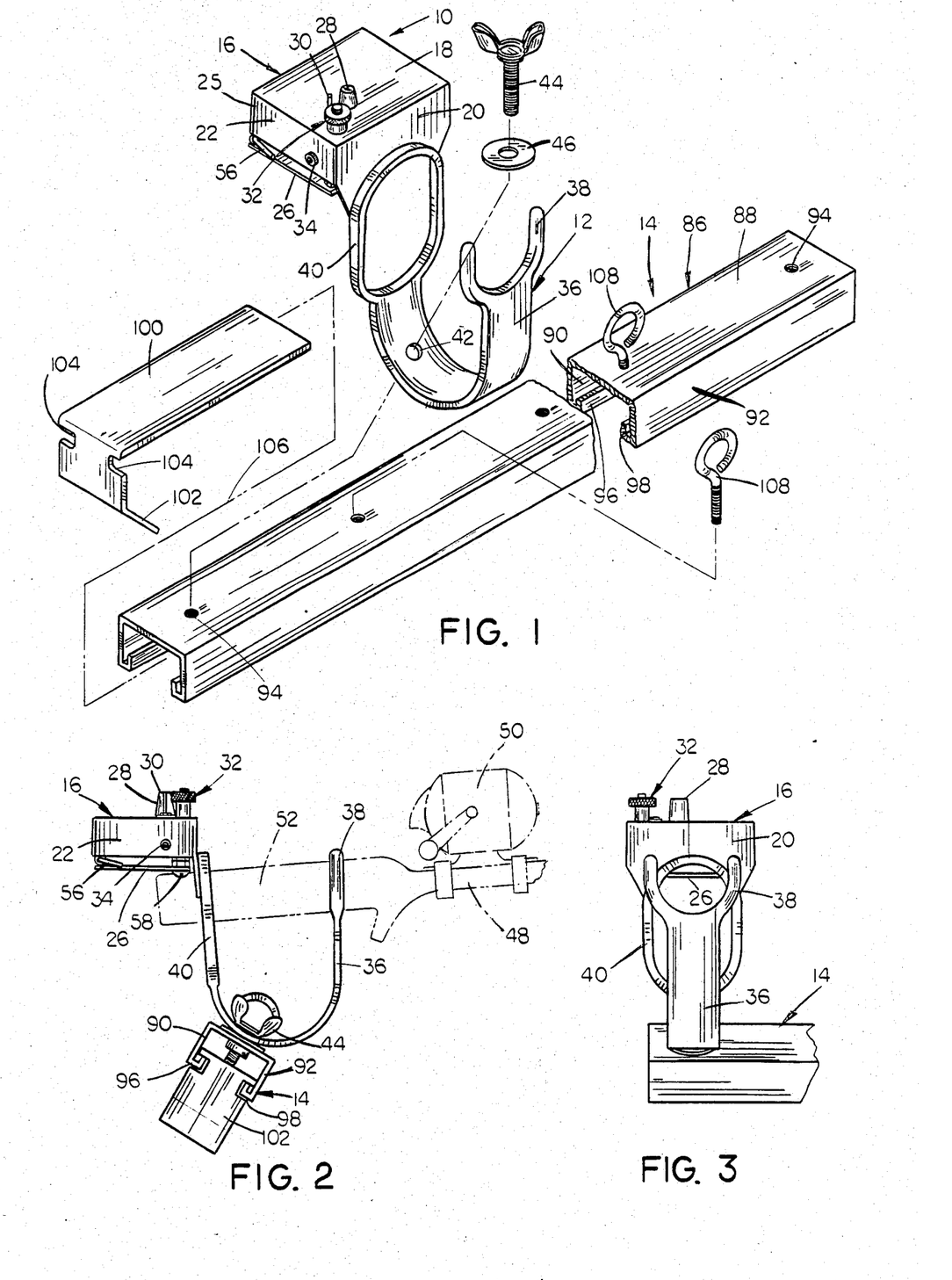
FIG. 1 is an exploded perspective view of the signalling device and rod holder support apparatus of the invention.
FIG. 2 is an elevational view of the signalling device and rod holder support apparatus with a fishing rod and reel indicated in dotted lines.
FIG. 3 is a front elevational view of the signalling device and rod holder support apparatus of FIG. 2.

The fishing rod holder signalling device 10 of the present invention is shown in FIG. 1 as being integrally formed with a fishing rod holder 12 which is supported by the rod holder support system indicated generally at 14.

The signalling device 10 includes a switch housing 16 having a top wall 18, front wall 20, opposite side walls 22 and 24 and a hinged bottom wall 26, alternately referred to herein as the switch lever. On the top wall 18, there is provided a lamp 28, an on-off switch 30 and a switch lever tension adjustment screw 32. A double contact phone jack 34 is mounted on side wall 22 for plugging an alternate battery pack into the circuit and electrically disconnecting the battery in housing 16 from the circuit.

Fishing rod holder 12 includes a generally U-shaped base 36 having an open topped channel portion 38 on the forward leg thereof and a rod handle receiving rim portion 40 on the rearward leg thereof. Base 36 has a mounting hole 42 therein for securing the rod holder 12 to a support apparatus by a first fastener such as the wing bolt 44 and associated washer 46.

The operation of the fishing rod holder 12 is evident in FIG. 2 wherein a fishing rod 48 is shown in dotted lines, including a reel 50 and handle 52. The rearward end of handle 52 is inserted through the rim portion 40 with the forward portion of the handle resting on channel portion 38. The weight of the reel and extended forward end of the rod urge the rearward end of the handle upwardly in engagement with the top of rim portion 40. In the present invention, however, the front wall 20 of switch housing 16 is fixed to the rim portion and the bottom wall or switch lever 26 protrudes downwardly below the top of the rim portion as shown in FIG. 3 so that the rearward end of the fishing rod handle is urged upwardly against the switch lever 26.

Figure 4:
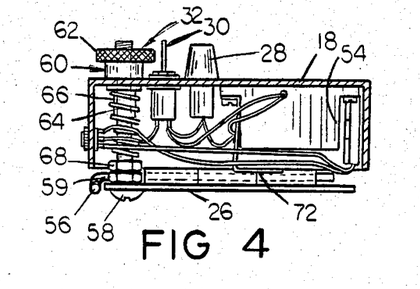
FIG. 4 is a front sectional view of the signalling device.
Figure 5:
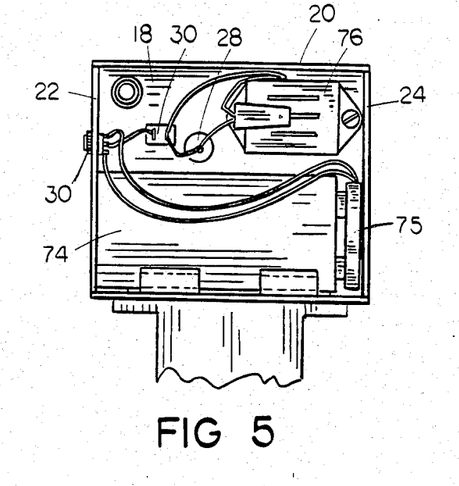
FIG. 5 is a bottom view of the signalling device with the bottom wall removed.
Figure 6:
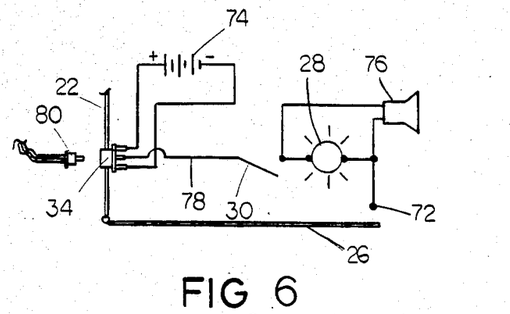
FIG. 6 is a schematic electrical circuit diagram for the signalling device of the invention.

The structure of signalling device 10 is shown in FIGS. 4, 5 and 6. FIG. 4 shows the lamp 28, on-off switch 30 and tension adjustment screw 32 mounted on the top wall, phone jack 34 on side wall 22 and a battery receiving cradle 54. The bottom wall 26 is hinged to the back wall 25 by removable hinge pin 56.

The forward end of switch lever 26 has a hole through which a screw 58 is inserted and secured in place by a lock nut 59. Screw 58 extends upwardly through the housing top wall 18, as shown in FIG. 4, for receiving the tension adjustment nut 60 having a finger grip flange 62 for easy adjustment without tools. A compression spring 64 and spring sleeve 66 are received on the screw 58 between the top wall 18 and switch lever 26 as shown. A second nut 68 is positioned on screw 58 between the spring 64 and lock nut 59 for adjusting the sensitivity of the device. Fine tuning of the sensitivity is afforded by the thumb nut 60.

Compression spring 64 is thus operative to adjust the amount of force required for pivotally moving the switch lever 26 upwardly into electrical contact with the switch plate 72. By rotating the adjustment nuts 60 and 68 in a direction to compress spring 64, the force required to close the switch is increased, thereby decreasing the sensitivity of the signalling device. Conversely, by rotating the adjustment nuts 60 and 68 in a direction to allow spring 64 to expand, a lesser force will be operative to raise switch lever 26 into engagement with switch plate 72, for increased sensitivity of the signalling device.

FIG. 4 also shows the switch plate 72 which extends downwardly for engagement by the switch lever 26 to complete an electrical circuit with the lamp 28. Switch plate 72 has a somewhat Z-shape in the embodiment shown. In FIG. 5, it is seen that a conventional 9-volt battery 74 is adapted to lie within the housing for connection to the circuit by conventional battery snape 75. FIG. 5 also illustrates a horn 76 which is connected in parallel with lamp 28 as further indicated in the schematic circuit diagram of FIG. 6.

In FIG. 6, it is seen that the opposite terminals of battery 74 are connected to the phone jack 34 which effects a connection of one battery terminal to the housing sidewall 22 and the opposite terminal to lead wire 78 for connection to on-off switch 30. In the event that battery 74 should become discharged, an alternate battery pack equipped with a plug 80 can be quickly substituted for the internal battery 74 by simply inserting plug 80 into phone jack 34. On-off switch 30 interrupts the circuit to lamp 28 which is connected in parallel with horn 76. Swtich lever 26 and switch plate 72 coact to provide the actuating switch for the circuit.

Whereas many circuits are possible for the signalling device 10, the arrangement of FIG. 6 is preferred for its simplicity and economy. The various parts represented therein are easily commercially available. For example, horn 76 may be a Radio Shack 12-volt mini-buzzer referred to by catalog No. 273-055. On-off switch 30 may be a Radio Shack SPST microminiature toggle switch referred to by catalog No. 275-624. Phone jack 34 may be a Radio Shack sub-miniature phone jack, catalog No. 274-292. Lamp 28 may be a Radio Shack miniature panel lamp with a 12-volt, 50 milliamp rating and referred to by catalog No. 272-322. Finally, the battery snaps 75 are also commercially available as Radio Shack catalog No. 270-325.

Figure 7:
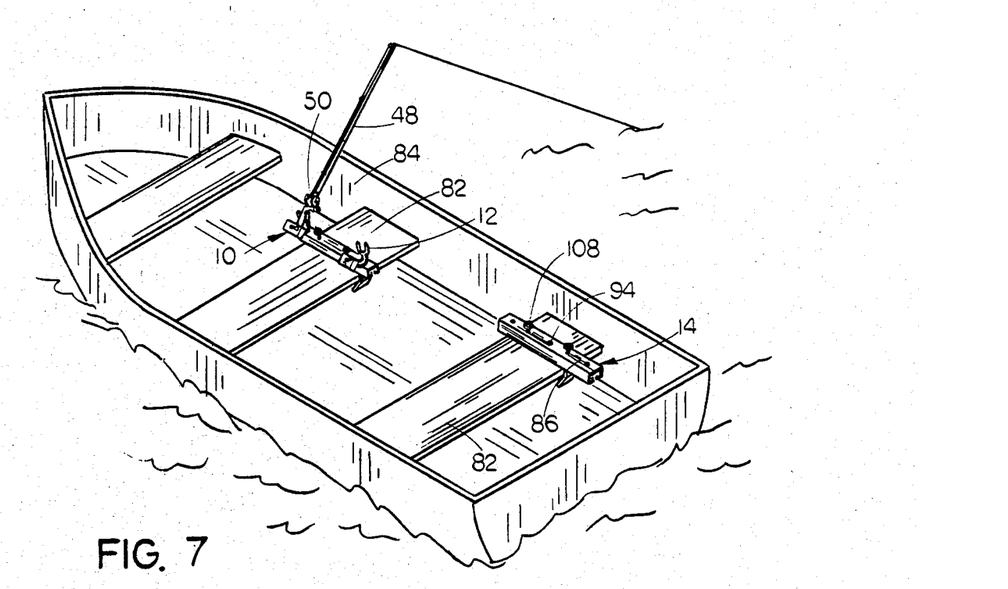
FIG. 7 is a perspective view showing the fishing rod holder support apparatus of the invention installed on the seats of a boat.

Referring now to FIG. 7, the use and operation of the rod holder support system 14 is illustrated. Basically, this system is secured onto a seat panel 82 of boat 84 for supporting one or more rod holders 12 equipped with signalling devices 10. The structure of the rod holder support system 14 is more clearly illustrated in FIG. 1 as including an elongated channel strip 86 including a top wall 88 and a pair of spaced-apart depending side walls 90 and 92. Top wall 88 has a plurality of longitudinally spaced-apart holes 94. The side walls 90 and 92 each include interiorly directed flanges 96 and 98, respectively, which are arranged in spaced relation from top wall 88 for slidably supporting a securement bracket 100 having a depending jaw 102 which may be equipped with slots 104 for receiving the flanges 96 and 98. Securement bracket 100 is slidably inserted into the end of channel strip 86 as indicated by dotted line 106 whereupon an eyebolt or second fastener 108 is threaded into one of the holes 94 for locking the securement bracket 100 in the selected position. A second securement bracket, not shown, is likewise inserted into the opposite end of channel strip 86 for securement in any selected position by another eyebolt 108. The unused holes 94 are then available for mounting one of the rod holders 12. FIG. 1 also illustrates that the mounting hole 42 in rod holder 12 is movable into registration with a hole 94 for securement of the rod holder at that position by inserting a wing bolt or first fastener 44 and accompanying washer 46. It can be seen that the rod holder 12 can be rotated about wing bolt 44 to the desired orientation.

In operation, generally one of the securement brackets 100 is secured adjacent one end of the channel strip. The strip is then placed onto a boat seat 82 whereupon another securement bracket is inserted into the opposite end of the channel strip and moved to a position to sandwich the seat between the depending jaws, whereupon the second securement bracket is fixed in position to securely support the channel strip on the boat seat. The rod holders are then quickly and easily attached with wing bolts 44 and one is ready to fish.

Figures 8, 9, 10:
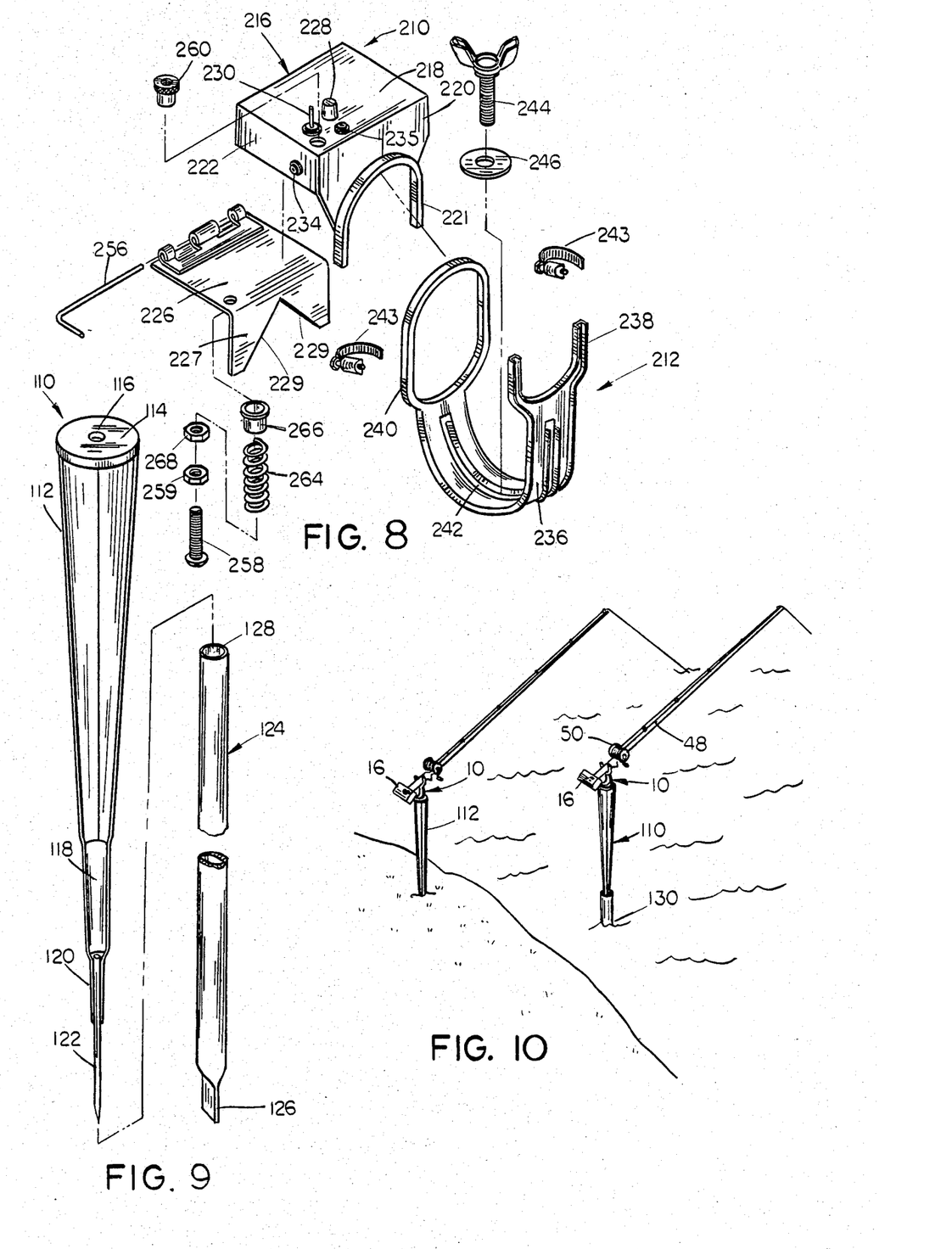
FIG. 8 is an exploded perspective view of an alternate embodiment of the invention.
FIG. 9 is a perspective view of the improved ground stake and tubular extension of the invention.
FIG. 10 is a diagrammatic illustration of the improved ground stake and extension tube in operation.
Figure 11:
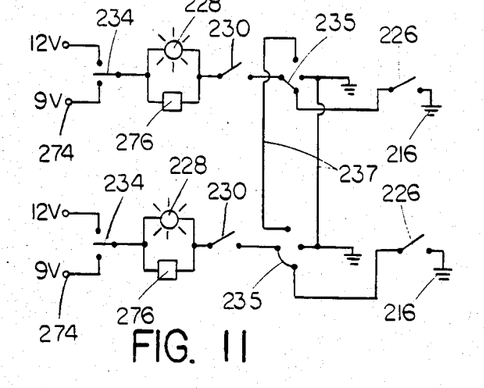
FIG. 11 is a schematic electrical circuit diagram for a signalling device connected in tandem with a second signalling device for actuation of a remote signal.

An alternate support system for the rod holder 12 is shown in FIGS. 9 and 10. A ground stake 110 includes an elongated upper portion 112 having top and bottom ends. A support base plate 114 is secured to the top end of upper portion 112 and is provided with a threaded mounting hole 116. An elongated generally semi-cylindrical medial portion 118 extends downwardly from upper portion 112. Finally, a lower portion 120 of reduced width relative to the medial portion 118 extends downwardly therefrom for insertion into the ground. Lower portion 120 may be provided with a solid tip 122 to facilitate insertion into the ground.

Ground stake 110 further includes an elongated tubular extension member 124 having a tapered lower end portion 126 adapted for insertion into the ground and an open topped upper end portion 128 having a diameter adapted for slidably receiving the semi-cylindrical medial portion 118 of stake 112 in telescopic relation therein. The combining stake 112 and extension 124 provide a ground stake 110 of extended length for use in supporting a rod holder 12 at an offshore location as indicated at 130 in FIG. 10. The stake 112 of course may also be used alone on the shore without the extension 124 as also indicated in FIG. 10.

An alternate embodiment of the rod holder and signalling device of the present invention is shown in FIG. 8. Those parts which correspond to similar parts of the embodiment of FIG. 1 will be identified by similar reference numerals prefixed by the numeral 2.

A primary difference presented by the embodiment of FIG. 8 is that the signalling device 210 is not integrally formed with the fishing rod holder 212. Rather the housing front wall 220 is provided with an open bottomed generally inverted U-shaped mounting rim 221 which is adapted for registration with a similarly shaped rim portion 240 of rod holder 212. It is preferred that the rim portion 240 be of channel construction as indicated for the forward channel portion 238 so that the mounting rim 221 may be pressed into the recess defined by the channel shape of rim portion 240. Clamps 243 are provided to prevent disengagement of the mounting rim 221 from rim portion 240.

Another significant modification for the signalling device of FIG. 8 is the shape of the switch lever 226. Specifically, a depending flange 227 is provided at the forward edge of the lever, which flange has a pair of downwardly an outwardly flaring inclined contact surfaces 229. Since these contact surfaces are situated below the switch lever 226 generally, they are engaged by the rod handle 52. Because of the inclination of these surfaces 229, even lateral forces against them will result in upward movement of the switch lever 226.

The rod holder base portion 236 in FIG. 8 is equipped with an elongated flanged slot 242 instead of the single mounting hole 42 as in the embodiment of FIG. 1. Slot 242 enables the orientation of the fishing rod to be adjusted as desired by moving the rod holder base 236 for engagement by the wing bolt 244 at selected positions therealong. The rod holder 212 is of conventional construction except that the channel portion 238 is bent rearwardly back toward the rim portion 240 so that the longitudinal distance between them is only approximately 4". Conventionally, the channel portion 238 and rim portion 240 are spaced substantially further apart.

Finally, it can be seen that the signalling device 210 of FIG. 8 includes on top wall 218 an additional phone jack 235. The purpose of the second phone jack 235 is to enable a pair of signalling devices 210 to be interconnected for actuating an alarm in a location remote from the fishing site such as in one vehicle or cabin. One of the signalling devices 210 is mounted on a fishing rod holder in the usual manner. Upon actuation of the lamp and horn in response to pivotal movement of the fishing rod handle by a fish on the line, a circuit is completed through a wire 237 to the lamp and horn of the second signalling device 210 for alerting the fisherman that a fish has struck the line of the fishing rod at the other signalling device. Connection 235 can be made either by an elongated wire having phone jack plugs at both ends or by a wireless connection including a transmitter connected to the signalling device on the fishing rod holder and a receiver connected to the signalling device 210 at the remote location. Such transmitters and receivers are commercially available and one possible such transmitter is available from Radio Shack bearing an identification number of FCC ID BKA9BJ60-3074.

Thus the modifications presented by the signalling device 210 increase the versatility of the invention by making it adaptable for use with conventional rod holders 212 and also by making the device operative for use both in trolling or set fishing. The inclinations 229 of the switch lever flange 227 make the device responsive to lateral as well as vertical movements of the fishing rod handle so that even lateral swimming movements of a fish on the line will actuate the lamp and horn of the signalling device.

The wide range adjustability of the spring tension afforded by both the internal adjustment nut 68 and thumb nut 62 enable adjustment of sensitivity so that the device will be actuated by either only a slight bend of the tip of the rod or only when the rod is substantially bent to approximately a one and a half foot arc. The sensitivity can be further adjusted by replacing the spring 64 with a heavier spring or by using it in combination with a second spring.

The separate signalling device 210 of FIG. 8 is small enough to be easily stored in one's tackle box. Furthermore, front wall 220 may be bent to accommodate an inclination of the switch housing 216 relative to the mounting rim 221 so that the switch lever 226 is properly positioned for engagement by a rod handle.

Figure 12:
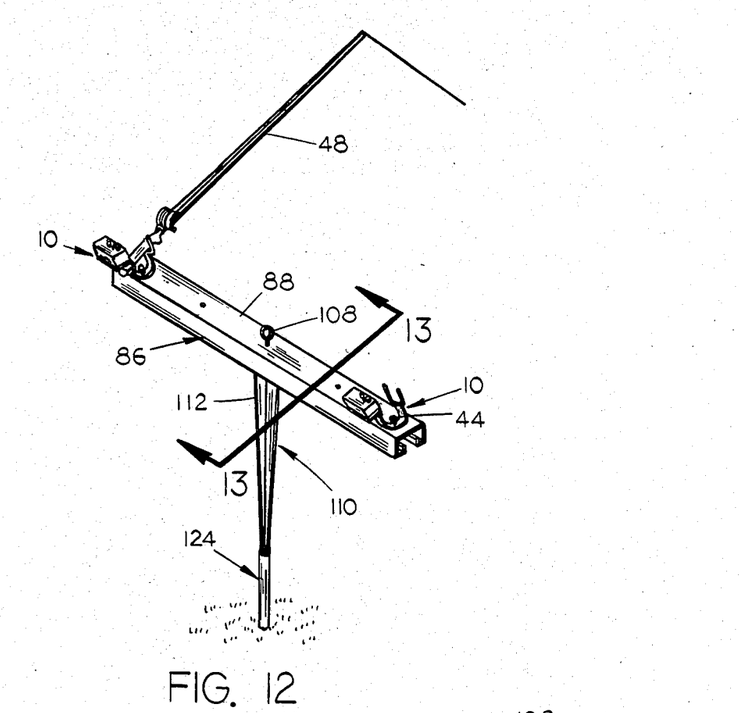
FIG. 12 is a perspective view of the channel strip mounted on the ground stake.
Figure 13:
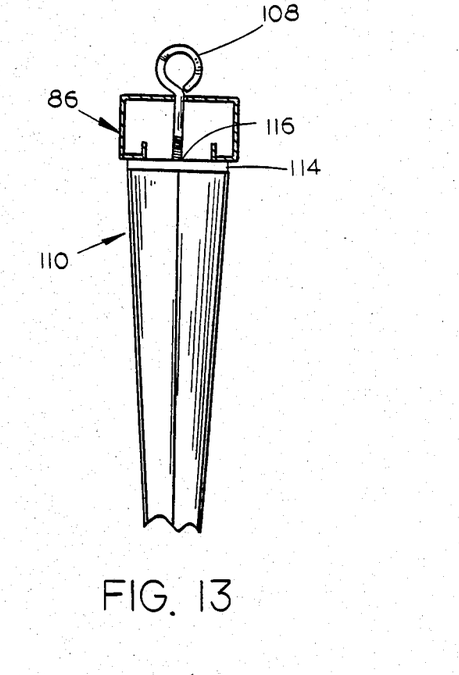
FIG. 13 is an enlarged partially sectional detail view taken along line 13—13 in FIG. 12.

FIGS. 12 and 13 illustrate that the channel strip 86 and ground stake 110 may be used in combination for supporting a plurality of fishing rod holders 12 on the single stake 110. The base plate 114 of ground stake 110 is engaged against the undersides of flanges 96/98 and longitudinally positioned so that the mounting hole 116 is registered with a selected one of the channel strip top wall holes 94, preferably the center hole for balance. The second fastener or eyebolt 108 may then be inserted through the registered holes, being threaded into hole 116 for securing the channel strip on ground stake 110.

An alternate use of the channel strip 86 is shown in FIGS. 14–18 wherein the strip is provided with a pair of channel brackets 310, a pair of pivot arms 312 and a pair of wall brackets 314. The object is for the channel strip 86, boat wall 316 and arms 312 to function as a parallelogram linkage for pivotal movement of the channel strip from the working position of FIGS. 15 and 17 in spaced relation from the boat side wall 316 to the storage position of FIGS. 16 and 18 adjacent the side wall 316. The channel strip 86 remains generally parallel to the boat sidewall 316 throughout its path of pivotal movement.

Figure 14:
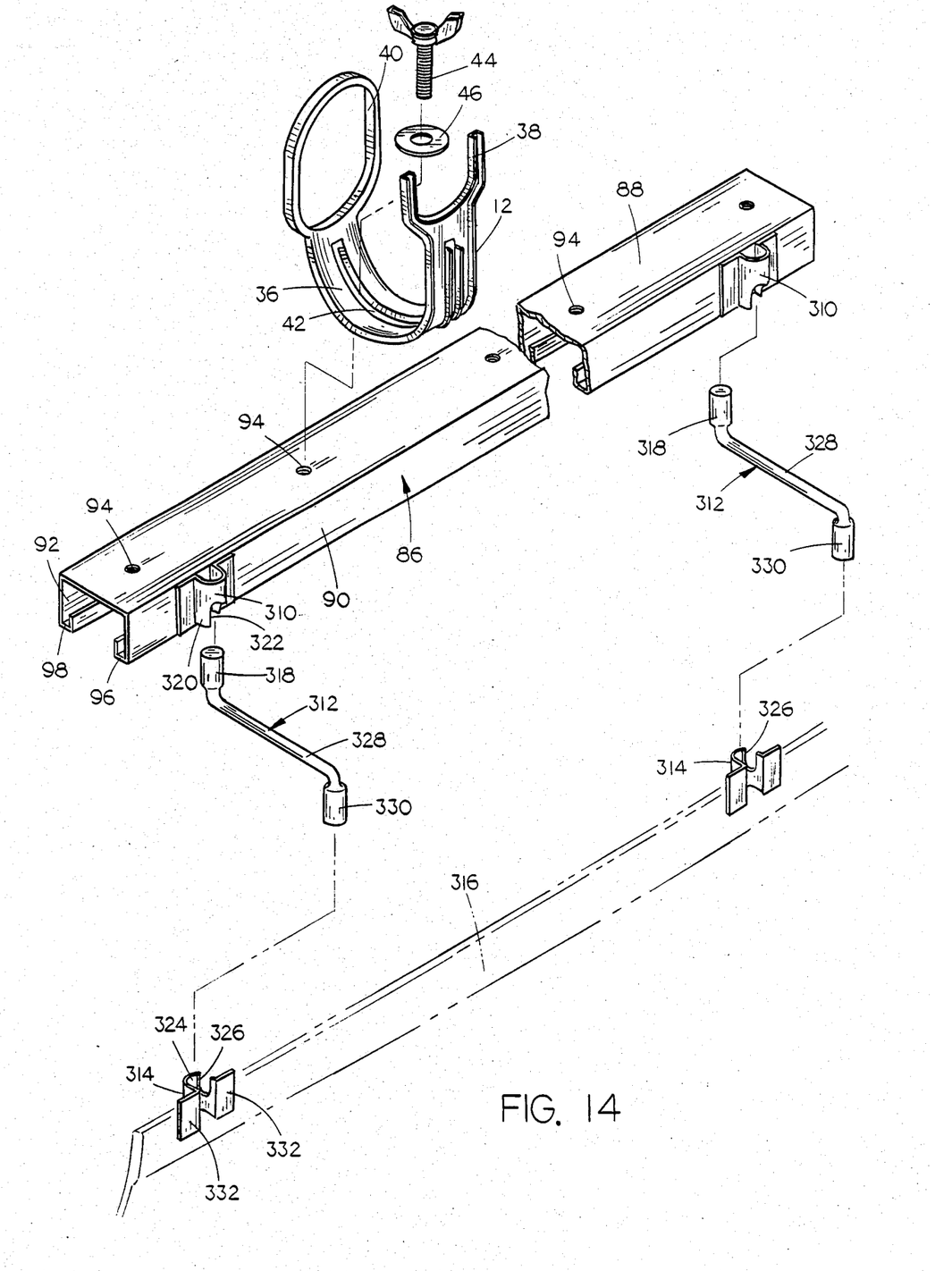
FIG. 14 is an exploded perspective view of the pivotal channel strip support system of the invention.
Figure 15:
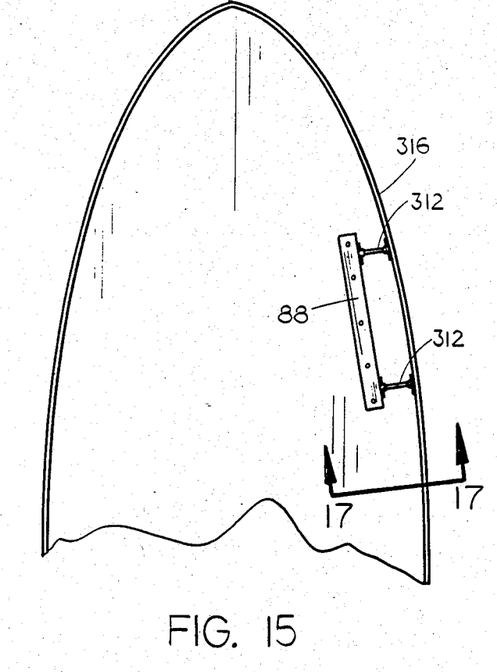
FIG. 15 is a plan view of a boat with the channel strip mounted on one side wall thereof in the working position.
Figure 16:
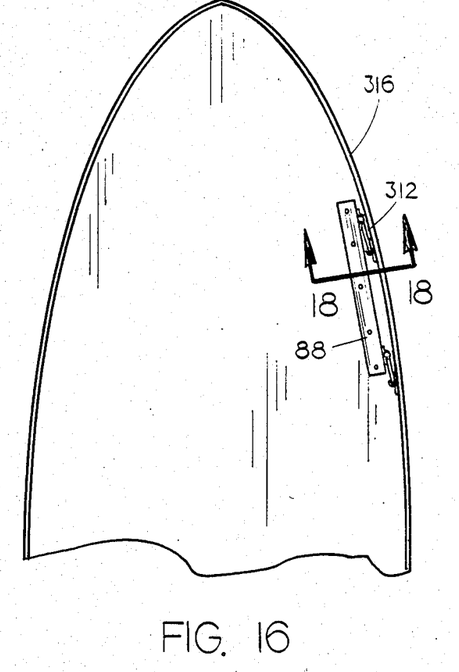
FIG. 16 is a plan view of a boat with the channel strip mounted on one side wall thereof in the storage position.
Figure 17:
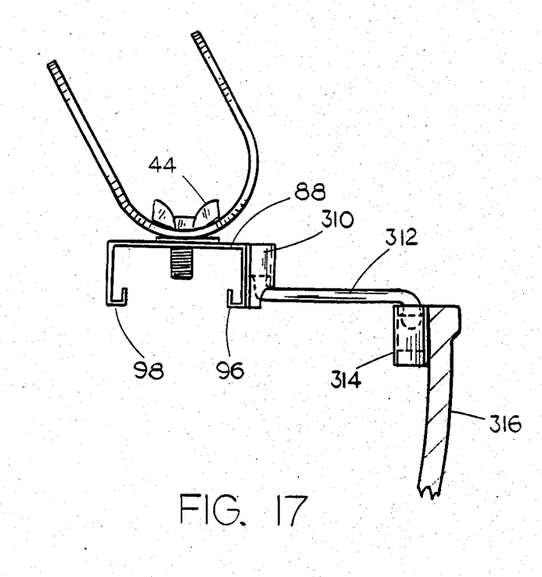
FIG. 17 is an enlarged end sectional view taken along line 17—17 in FIG. 15.
Figure 18:
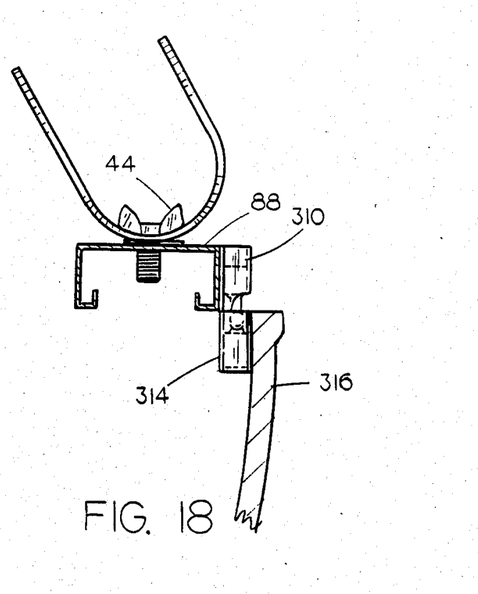
FIG. 18 is an enlarged end sectional view taken along line 18—18 in FIG. 16.

The arm 312 has a turned up interior end portion 318 of increased diameter for insertion within the curved guideway 320 of channel bracket 310. An open bottomed vertical lock notch 322 is centered on guideway 320 so that when the channel is moved to its working position, the strip lowers upon receiving the arms 312 in the notches 322 to releasably lock the channel strip in that position. Likewise, the wall brackets 314 have a central curved guideway 324 with an open-topped notch 326 for receiving arm 312 where the channel strip 86 is moved to its storage position. The width of the notches is substantially equal to the diameter of the central portion 328 of arm 312 between the turned up interior end portion 318 and turned down exterior end portion 330. The mounting flanges 332 for each wall bracket may be connected to the boat side wall 316 by any suitable means such as bolts, adhesives, suspension hooks or the like.

I claim:

1. In combination, a fishing rod holder having a base with a mounting hole therein, an apparatus for supporting said fishing rod holder, comprising, an elongated channel strip including a top wall and a pair of spaced-apart depending side walls, said top wall of the channel strip having a plurality of longitudinally spaced-apart holes therein, said fishing rod holder being positioned with the mounting hole thereof in registered relation with a selected one of said top wall holes, first fastener means insertable through said registered holes for securing said fishing rod holder on said channel strip, flange means extended generally horizontally from said side walls in spaced relation from said top wall, at least one securement bracket slidably supported on said flange means and including a depending jaw, and second fastener means for securing said securement bracket in a selected position along said channel strip.

2. The combination of claim 1 further comprising a second securement bracket and additional second fastener means for securing said second securement bracket in a selected position along said channel strip whereby a support surface may be engaged between the depending jaws of said securement brackets.

3. The combination of claim 1 wherein said flange means extend interiorly from said side walls and said securement bracket includes an elongated base plate which is slidably supported on said flange means.

4. The combination of claim 3 wherein said base plate is at least as long as the spacing between said spaced-apart holes in the channel strip top wall.

5. The combination of claim 4 wherein said second fastener means comprises screw means threadably insertable through said top wall holes for pressing said base plate against said flange means.

6. An apparatus for supporting a fishing rod holder having a base with a mounting hole therein, siad apparatus comprising an elongated channel strip including a top wall and a pair of spaced-apart depending side walls, said top wall of the channel strip having a plurality of longitudinally space-apart holes therein, said fishing rod holder being positioned with the mounting hole thereof in registered relation with a selected one of said top wall holes, first fastener means insertable through said registered holes for securing said fishing holder on said channel strip, flange means extended generally horizontally from said side walls in spaced relation from said top wall, a ground stake having an elongated upper portion having top and bottom ends, a support base secured to the top end of said upper portion and having a mounting hole therein, an elongated generally cylindrical medial portion extended downwardly from the bottom end of said upper portion, and a lower portion of reduced width relative to said medial portion secured to and extending downwardly from said medial portion for insertion into the ground, said ground stake being positionable with the support base engaged against the undersides of said flange means and with the ground stake mounting hole in registered relation with a selected one of said top wall holes, and second fastener means insertable through said registered holes of said ground stake and channel strip top wall for securing said ground stake on said channel strip whereby a plurality of fishing rod holders may be supported on a single ground stake.

7. The apparatus of claim 6 wherein one of said wall holes is generally cenetered thereon, said second fastener means being inserted through said centered hole and ground stake mounting hole.

8. The apparatus of claim 7 wherein said ground stake hole is threaded for receiving said second fastener means comprised of an elongated bolt.

9. An apparatus for supporting a plurality of fishing rod holders, each having a base with a mounting hole therein, said apparatus comprising, an elongated channel strip including a top wall and a pair of spaced-apart depending side walls, said top wall of the channel strip having a plurality of longitudinally spaced-apart holes therein, a fishing rod holder being positionable with the mounting hole thereof in registered relation with a selected one of said top wall holes, first fastener means insertable through said registered holes for securing said fishing rod holder on said channel strip, and support means for supporting said channel strip on a wall for pivotal movement of said channel strip between a storage position adjacent said wall and a working position in spaced relation from said wall.

10. The apparatus of claim 9 wherein said support means includes a pair of arms, means for connecting one end of each arm to one side wall of said channel strip in spaced apart relation for pivotal movement about respective upright axes, and bracket means adapted for connection to a wall and for supporting the opposite ends of said arms for pivotal movement about respective upright axes whereby, upon spacing said opposite ends the same as said one ends, said arms, wall and channel strip function as a parallelogram linkage.

11. The apparatus of claim 10 further comprising lock means for releasably locking said arms in positions corresponding to the storage and working positions of said channel strip.

12. The apparatus of claim 11 wherein said lock means comprises vertical notches in said bracket means for receiving said arms upon pivotal movement of said arms to positions in registration with said notches.

* * * * *